US008564430B2

(12) United States Patent
Katazawa et al.

(10) Patent No.: US 8,564,430 B2
(45) Date of Patent: Oct. 22, 2013

(54) DEVICE FOR DETECTING SPACE OBJECTS

(75) Inventors: Yukihito Katazawa, Ichikawa (JP); Akira Sakurai, Fukuoka-ken (JP)

(73) Assignees: IHI Corporation (JP); Institute for Q-Shu Pioneers of Space, Inc. (JP)

( * ) Notice: Subject to any disclaimer, the term of this patent is extended or adjusted under 35 U.S.C. 154(b) by 492 days.

(21) Appl. No.: 12/863,035

(22) PCT Filed: Jan. 16, 2009

(86) PCT No.: PCT/JP2009/050560
§ 371 (c)(1),
(2), (4) Date: Jul. 15, 2010

(87) PCT Pub. No.: WO2009/091037
PCT Pub. Date: Jul. 23, 2009

(65) Prior Publication Data
US 2011/0050258 A1    Mar. 3, 2011

(30) Foreign Application Priority Data
Jan. 17, 2008   (JP) .................................. 2008-008452

(51) Int. Cl.
*G08B 23/00*     (2006.01)
(52) U.S. Cl.
USPC .......................... 340/500; 73/12.11; 73/170.25
(58) Field of Classification Search
USPC .............. 340/500; 73/12.11, 170.25; 244/1 R
See application file for complete search history.

(56) References Cited

U.S. PATENT DOCUMENTS

| 3,277,724 | A |   | 10/1966 | Lundeberg |
| 3,407,304 | A |   | 10/1968 | Kinard |
| 4,964,300 | A | * | 10/1990 | Kinard et al. .............. 73/170.25 |

FOREIGN PATENT DOCUMENTS

| CN | 101023317 A | 8/2007 |
| FR | 861617 | 2/1941 |
| JP | 61-72999 | 4/1986 |
| JP | UM-A-64-031890 | 2/1989 |
| JP | 5-286500 | 11/1993 |
| JP | 6-219399 | 8/1994 |
| JP | A-07-267200 | 10/1995 |

(Continued)

OTHER PUBLICATIONS

International Search Report and Written Opinion mailed Apr. 28, 2009 in corresponding PCT International Application No. PCT/JP2009/050560.
European Search Report, dated Sep. 3, 2012, issued in corresponding European Application No. EP 09 70 2310, total 4 pages.
Office Action dated Mar. 21, 2012 issued in corresponding Japanese Patent Application No. 2009-550061 with English translation (5 pages).

(Continued)

*Primary Examiner* — John A Tweel, Jr.
(74) *Attorney, Agent, or Firm* — Ostrolenk Faber LLP

(57) ABSTRACT

The present invention has the object of simplifying apparatus configuration and avoiding a requirement for calibration. The present invention achieves the above object by forming a detection sheet element that retains in a predetermined array pitch a plurality of conductive detection lines that are lead lines formed by etching or the like on a non-conductive thin film that can be exposed in a space environment. A detection circuit connected to each detection line of the detection sheet element is provided. When an object flying in space collides with the detection sheet body, since a detection line on the detection sheet element is ruptured, constant monitoring of the conductivity of the detection line by the detection circuit enables detection of the object flying in space that has collided with the detection sheet element when a detection line is ruptured. Furthermore a means of solution is adopted in which an effective diameter of a colliding object flying in space can be detected from the number of severed detection lines.

24 Claims, 8 Drawing Sheets

(56) References Cited

FOREIGN PATENT DOCUMENTS

| | | |
|---|---|---|
| JP | 2516204 | 11/1996 |
| JP | 10-300395 | 11/1998 |
| JP | 11-227699 | 8/1999 |
| JP | 2000-25700 | 1/2000 |
| JP | 3870349 | 1/2007 |
| JP | 3870350 | 1/2007 |

OTHER PUBLICATIONS

Office Action dated Sep. 5, 2012 issued in corresponding Chinese Patent Application No. 200980108349.4 with English translation (31 pages).

Japanese Office Action (Notice of Reasons for Rejection) dated Jan. 8, 2013 with English translation.

* cited by examiner

DEVICE FOR DETECTING SPACE OBJECTS

CROSS-REFERENCE TO RELATED APPLICATIONS

The present application is a 35 U.S.C. §§371 national phase conversion of PCT/JP2009/050560, filed Jan. 16, 2009, which claims priority of Japanese Patent Application No. 2008-008452, filed Jan. 17, 2008, the contents of which are incorporated herein by reference. The PCT International Application was published in the Japanese language.

TECHNICAL FIELD

The present invention relates a detection apparatus for an object flying in space for use in detection of the presence of an object flying in space, for example in an orbit revolving about the earth.

BACKGROUND ART

In space, there is a large amount of space debris of artificial projectile-related objects such as the wreckage of rockets or artificial satellites which have completed their mission, or the fragments of such objects resulting from explosions in orbits that revolve about the earth. Furthermore cosmic dust (microscopic meteoroids) formed from natural rock, or minerals or metals are also present.

Objects flying in space such as space debris or cosmic dust displace at a high velocity and therefore pose a risk of having a serious effect on operating space vessels by colliding with a space vessel such as an artificial satellite, manned spaceship or space station during operation. As a result, the formulation of strategies to prevent collisions between operating space vessels and these types of object flying in space requires an accurate analysis of the state in which the objects flying in space exist in the space environment.

For this reason, terrestrial-based optical telescopes or radar are used to measure relatively large space debris of the objects flying in space. However the methods associated with these types of measurements can only measure space debris with a size of at least several centimeters in diameter. Therefore there is a need for detection by satellites or the like of objects flying in space of less than that size which will actually collide to thereby investigate the distribution and the like of such objects.

Conventional methods of detection of objects flying in space based on collision with an object flying in space include a method of measuring vibration or sound produced during a collision of an object flying in space using a detection apparatus such as a piezo film, a piezo-element, a microphone or the like (for example refer to Patent Literature 1), a method of using a predetermined detection apparatus to measure an electrical charge or light when the object flying in space is transformed into plasma by a collision, or a method of applying a charge in advance to a piezo film which serves as a detection apparatus and measuring the voltage fluctuation produced when the object flying in space collides with and passes through the film.

In addition, a method of detecting a collision with an object flying in space has been investigated in which gas is placed into a small bottle and a change in pressure is measured in the bottle that is produced by the escape of gas resulting from a collision of the object flying in space with the bottle.

[Patent Literature 1] Japan Patent Application, First Publication No. 5-286500

DISCLOSURE OF THE INVENTION

Problem to be Solved by the Invention

However all the above conventional methods that have been investigated for the detection of a collision with an object flying in space encounter difficulty when set to a wide detection region. In other words, the execution of a method for measuring a sound or vibration produced during a collision with an object flying in space requires a hardness of a level that produces a vibration or sound during a collision with an object flying in space. Furthermore since a detection apparatus must be provided for each range in which a sound or vibration is produced by a collision with an object flying in space, a large number of apparatuses is required.

The measurement of a charge or of light produced when an object flying in space is transformed into plasma by a collision is limited to a range of a diameter of the level of 30 cm. Moreover the configuration of an apparatus to detect plasma is complicated and requires a large installation space.

A method in which a voltage change produced by collision and penetration of an object flying in space by application of a charge in advance to a piezo film is limited by the size of the piezo film itself to which the charge is applied.

In a method of placing gas into a small bottle, a large number of bottles are required to increase the detection area which thereby entails a risk of increasing the complexity and the weight of the apparatus.

Moreover each of the conventional methods above requires a dedicated structure for detecting a collision with an object flying in space. Furthermore experiments and calculations modeling various collision patterns of an object flying in space must be performed on earth in advance and calibrations must be applied in order to comprehend what signal intensity will be electrically produced when an object flying in space of a certain particle diameter collides at a certain velocity. Consequently a large amount of time and trouble are required for such calibration.

The present invention is proposed in light of the above circumstances and has the object of providing a detection apparatus for an object flying in space that enables the apparatus configuration to be simplified and reduced in weight, that facilitates setting of a wide detection area, and moreover that enables detection of collision with an object flying in space without a particular requirement for calibration.

Means for Solving the Problem

To achieve the above object, in a first means of solution according to the present invention, a detection sheet element that retains in a predetermined array pitch a plurality of conductive detection lines on a non-conductive thin film that can be exposed in a space environment, and a detection circuit connected to each detection line are provided. A means of solution is adopted in which when a detection line on the detection sheet element is ruptured by a collision with an object flying in space, detection of the object flying in space that has collided with the detection sheet element is enabled by the detection circuit.

In a second means of solution, two detection sheet elements are provided that retain in a predetermined array pitch a plurality of conductive detection lines on a non-conductive thin film that can be exposed in a space environment, the detection sheet elements are laminated so that the direction in which the detection lines extend is mutually orthogonal, and furthermore a detection circuit connected to each detection line is provided. A means of solution is adopted in which when a detection line on the detection sheet element is ruptured by a collision with an object flying in space, detection of the object flying in space that has collided with each detection sheet element is enabled by the detection circuit.

In a third means of solution, a detection sheet element is provided that respectively retains in a predetermined array pitch a plurality of conductive detection lines extending in mutually orthogonal directions on both faces of a non-conductive thin film that can be exposed in a space environment, and a detection circuit connected to each detection line is provided. A means of solution is adopted in which when a detection line on the detection sheet element is ruptured by a collision with an object flying in space, detection of the object flying in space that has collided with each detection sheet element is enabled by the detection circuit.

In a fourth means of solution, a detection sheet element is provided that retains in a predetermined array pitch a plurality of conductive detection lines on a non-conductive thin film that can be exposed in a space environment, the detection sheet element is disposed in two layers separated by a predetermined interval, and furthermore a detection circuit is provided. A means of solution is adopted in which when a detection line on the detection sheet element is ruptured by a collision with an object flying in space, detection of the object flying in space that has collided with each detection sheet element is enabled by the detection circuit.

In a fifth means of solution, a laminated body is provided in which two detection sheet elements that retain in a predetermined array pitch a plurality of conductive detection lines on a non-conductive thin film that can be exposed in a space environment are laminated so that the direction in which the detection lines extend is mutually orthogonal, the laminated body is disposed in two layers separated by a predetermined interval, and furthermore a detection circuit is provided. A means of solution is adopted in which when a detection line on the detection sheet element is ruptured by a collision with an object flying in space, detection of the object flying in space that has collided with each detection sheet element is enabled by the detection circuit.

In a sixth means of solution, a detection sheet element is provided that respectively retains in a predetermined array pitch a plurality of conductive detection lines extending in mutually orthogonal directions on both faces of a non-conductive thin film that can be exposed in a space environment, the detection sheet element is disposed in two layers separated by a predetermined interval, and furthermore a detection circuit is provided. A means of solution is adopted in which when a detection line on the detection sheet element is ruptured by a collision with an object flying in space, detection of the object flying in space that has collided with each detection sheet element is enabled by the detection circuit.

In a seventh means of solution, a laminated body is provided in which two detection sheet elements that retain in a predetermined array pitch a plurality of conductive detection lines on a non-conductive thin film that can be exposed in a space environment are laminated so that the direction in which the detection lines extend is mutually orthogonal, a detection sheet element is provided that retains in a predetermined array pitch a plurality of conductive detection lines on a non-conductive thin film that can be exposed in a space environment, the laminated body and the detection sheet element are disposed in two layers separated by a predetermined interval, and furthermore a detection circuit is provided. A means of solution is adopted in which when a detection line on the detection sheet element is ruptured by a collision with an object flying in space, detection of the object flying in space that has collided with each detection sheet element is enabled by the detection circuit.

In an eighth means of solution, a detection sheet element is provided that respectively retains in a predetermined array pitch a plurality of conductive detection lines extending mutually orthogonal directions on both faces of a non-conductive thin film that can be exposed in a space environment, a detection sheet element is provided that retains in a predetermined array pitch a plurality of conductive detection lines on a non-conductive thin film that can be exposed in a space environment, the detection sheet elements are disposed in two layers separated by a predetermined interval, and furthermore a detection circuit is provided. A means of solution is adopted in which when a detection line on the detection sheet element is ruptured by a collision with an object flying in space, detection of the object flying in space that has collided with each detection sheet element is enabled by the detection circuit.

In the first to the eighth means of solution, the array pitch of the detection lines may be set to a dimension corresponding to the effective diameter which is the lower measurement limit for the object flying in space to be detected.

In addition, the width of the detection line may be set to a dimension corresponding to the effective diameter which is the lower measurement limit for the object flying in space to be detected.

Effects of the Invention

According to the present invention, the following superior effects are obtained.

(1) A detection sheet element that retains in a predetermined array pitch a plurality of conductive detection lines on a non-conductive thin film that can be exposed in a space environment, and a detection circuit connected to each detection line are provided. When a collision with an object flying in space ruptures a detection line in the detection sheet element, since a configuration is enabled in which detection of the object flying in space that has collided with the detection sheet element is enabled by the detection circuit, measurement of the distribution of objects flying in space is enabled by measuring how many objects flying in space have collided per unit area based on the surface area of the detection sheet element.

(2) Since the detection sheet element may dispose a detection line on a thin film, it can be adapted to be extremely lightweight and facilitates expansion of the area. Therefore the measurement region for objects flying in space can be simply expanded. Furthermore since the detection sheet element is lightweight and can be freely adapted to take various shapes, the detection sheet element can be freely disposed, for example, by attachment to a thermal blanket on an outer surface of a space vessel, expansion by using an antenna mounted on a space vessel, expansion using a predetermined mast, and the like.

(3) Since the principle of detection of an object flying in space is based on a simple phenomenon of rupturing a detection line by collision with an object flying in space, the detection circuit does not require calibration since an object flying in space that has collided with the detection sheet element can be detected from the presence or the absence of conduction in each detection line.

(4) A configuration is adopted in which two detection sheet elements are provided that retain in a predetermined array pitch a plurality of conductive detection lines on a non-conductive thin film that can be exposed in a space environment are laminated so that the direction in which the detection lines extend is mutually orthogonal, and furthermore a detection circuit connected to each detection line is provided. When a detection line on the detection sheet element is ruptured by a collision with an object flying in space, detection of the object flying in space that has collided with each detection sheet element is enabled by the detection circuit. Alternatively, a configuration is adopted in which a detection sheet element is provided that respectively retains in a predetermined array pitch a plurality of conductive detection lines extending in mutually orthogonal directions on both faces of a non-conductive thin film that can be exposed in a space environment, and a detection circuit connected to each direction line is provided. When a detection line on the detection sheet element is ruptured by a collision with an object flying in space, detection of the object flying in space that has collided with each detection sheet element is enabled by the detection circuit. Since these configurations enable the position of the ruptured detection line to be specified, detection of the size of the object flying in space that has collided with the detection sheet element or calculation of the direction of flight (incident direction) of the colliding object flying in space is possible.

(5) A configuration is adopted in which a detection sheet element is provided that retains in a predetermined array pitch a plurality of conductive detection lines on a non-conductive thin film that can be exposed in a space environment and is disposed as two layers separated by a predetermined interval, and a detection circuit is provided. When a collision with an object flying in space ruptures a detection line in the detection sheet element, detection of the object flying in space that has collided with the detection sheet element is enabled by the detection circuit. Alternatively, a configuration is adopted in which a laminated body is provided in which two detection sheet elements that retain in a predetermined array pitch a plurality of conductive detection lines on a non-conductive thin film that can be exposed in a space environment are laminated so that the direction in which the detection lines extend is mutually orthogonal, the laminated body disposed in two layers separated by a predetermined interval, and furthermore a detection circuit is provided. When a detection line on the detection sheet element is ruptured by a collision with an object flying in space, detection of the object flying in space that has collided with each detection sheet element is enabled by the detection circuit. Alternatively, a configuration is adopted in which a detection sheet element is provided that respectively retains in a predetermined array pitch a plurality of conductive detection lines extending in mutually orthogonal directions on both faces of a non-conductive thin film that can be exposed in a space environment, the detection sheet element is disposed in two layers separated by a predetermined interval, and furthermore a detection circuit is provided. When a collision with an object flying in space ruptures a detection line in the detection sheet element, since detection of the object flying in space that has collided with the detection sheet element is enabled by the detection circuit. Alternatively, a configuration is adopted in which a laminated body is provided in which two detection sheet elements retain in a predetermined array pitch a plurality of conductive detection lines on a non-conductive thin film that can be exposed in a space environment are laminated so that the direction in which the detection lines extend is mutually orthogonal, and a detection sheet element is provided that retains in a predetermined array pitch a plurality of conductive detection lines on a non-conductive thin film that can be exposed in a space environment, the laminated body and the detection sheet element are disposed in two layers separated by a predetermined interval, and furthermore a detection circuit is provided. When a detection line on the detection sheet element is ruptured by a collision with an object flying in space, detection of the object flying in space that has collided with each detection sheet element is enabled by the detection circuit. Alternatively, a configuration is adopted in which a detection sheet element is provided that respectively retains in a predetermined array pitch a plurality of conductive detection lines extending mutually orthogonal directions on both faces of a non-conductive thin film that can be exposed in a space environment, a detection sheet element is provided that retains in a predetermined array pitch a plurality of conductive detection lines on a non-conductive thin film that can be exposed in a space environment, the detection sheet elements are disposed in two layers separated by a predetermined interval, and furthermore a detection circuit is provided. When a detection line on the detection sheet element is ruptured by a collision with an object flying in space, detection of the object flying in space that has collided with each detection sheet element is enabled by the detection circuit. In this manner, detection of the direction of flight and velocity of an object flying in space that has collided with the detection sheet element is possible.

(6) By adopting a configuration in which the array pitch of the detection line is set to a dimension corresponding to the effective diameter which is the lower measurement limit of the object flying in space to be detected, when an object flying in space having an effective diameter which is the lower measurement limit collides with the detection sheet element, at least one detection line can be ruptured. Consequently accurate detection of the object flying in space is possible. Furthermore determination of the effective diameter of the object flying in space that has collided with the detection sheet element is possible based on the number of ruptured detection lines.

(7) A configuration is adopted in which the width of the detection lines is set to a dimension corresponding to a lower measurement limit of the effective diameter being an object flying in space to be detected. Therefore rupture of one detection line enables detection of a collision with an object flying in space having an effective diameter at least greater than or equal to the width dimension of the detection line.

BEST MODES FOR CARRYING OUT THE INVENTION

A first embodiment of the present invention will be described below making reference to the figures.

Figure 1A:
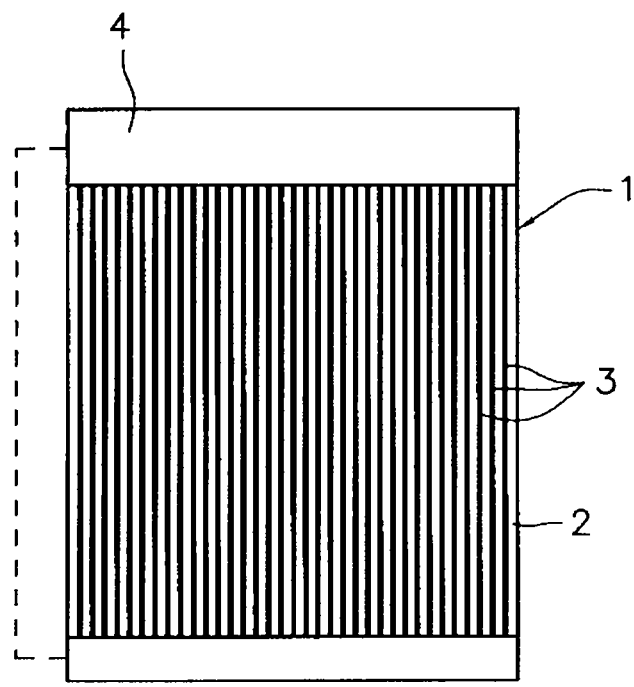
FIG. 1A is a schematic plan view of a detection apparatus for an object flying in space according to a first embodiment of the present invention.
Figure 1B:
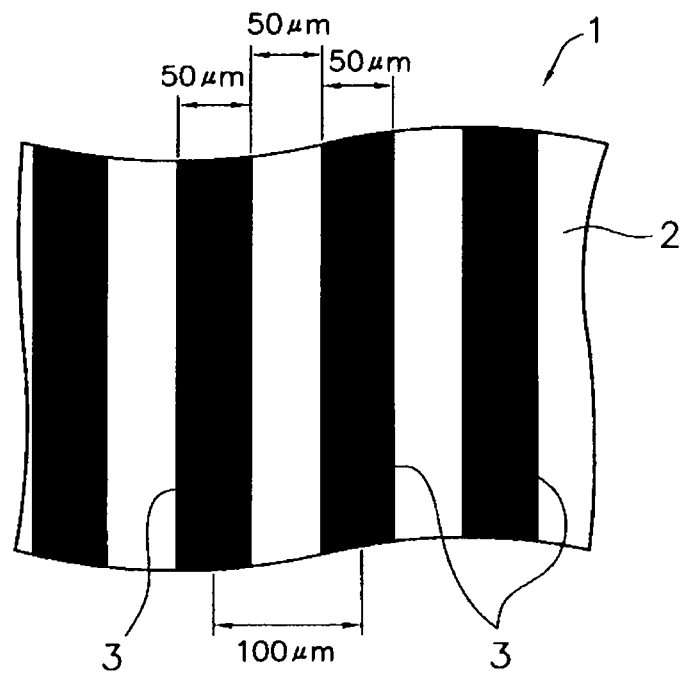
FIG. 1B is a partial enlargement view of a detection sheet element in a detection apparatus for an object flying in space according to the first embodiment of the present invention.
Figure 2:
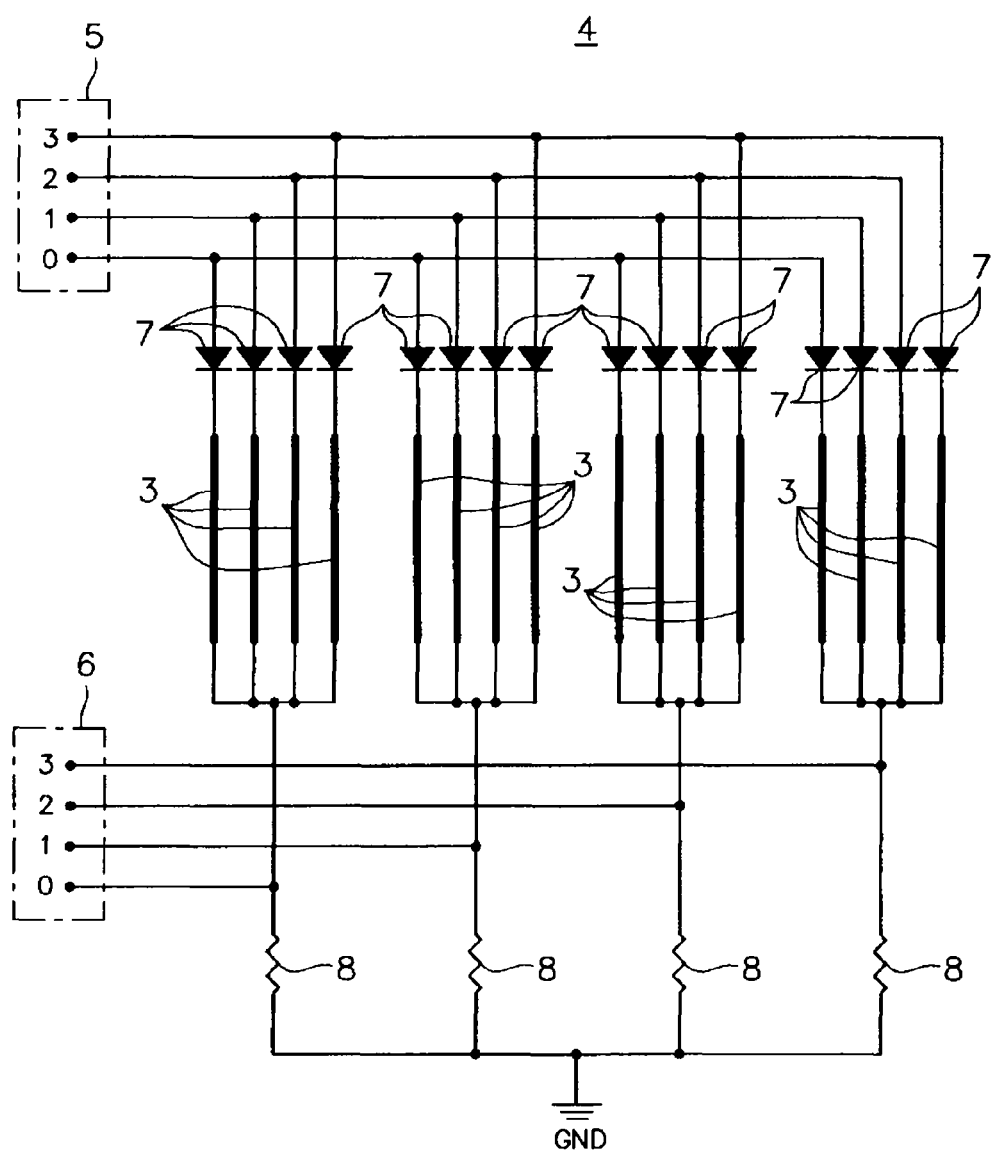
FIG. 2 is a circuit diagram showing an example of a detection circuit in FIG. 1A.

FIG. 1A, FIG. 1B and FIG. 2 show a detection apparatus for an object flying in space according to the present embodiment.

The detection apparatus includes a detection sheet element 1 which provides with a plurality of detection lines 3 disposed in parallel as fine linear conducting lines at an array pitch (spatial periodicity) corresponding to a particle diameter of an object flying in space to be detected is provided on a non-conductive thin film 2 that can be exposed in a space environment, and a detection circuit 4 electrically detecting the production of a rupture in each detection line 3 provided on the detection sheet element 1.

More specifically, when it is desired to detect an object flying in space that has an effective particle diameter of at least 100 μm, the detection sheet element 1 is configured so that the array pitch of each detection line 3 is 100 μm which is a dimension that corresponds to the particle diameter which is the lower measurement limit of the object flying in space, and for example, thereby disposes detection lines 3 having a width of 50 μm at an interval of 50 μm using copper foil in a technique such as etching on one surface of a thin film 2 having a thickness of 50 μm that is composed of a material such as polyimide. In this type of detection sheet element 1, one or more detection lines 3 of the detection lines 3 arrayed on one surface of the thin film 2 is ruptured upon collision of an object flying in space having an effective diameter of 100 μm or more.

Since the rupturing of each detection line 3 in the detection sheet element 1 may be detected as the loss of conductance in each detection line 3, it is equivalent to detection of an ON/OFF state in a plurality of switches.

As shown in FIG. 2, the detection circuit 4 is a circuit that performs digital detection using a diode matrix.

The detection circuit 4 has a circuit structure in which a row number and a column number are assigned to all detection lines 3 arrayed on the detection sheet element 1 to thereby enable discrimination of each detection line 3 by the above respective row number and column number. Each column of detection lines 3 is connected to each bit of a column output port 5 and each row of detection lines 3 is connected to each bit of a row input port 6. A diode 7 is used to insulate each detection line 3 from another.

In this type of detection circuit 4, the presence or absence of conduction in all detection lines 3 can be monitored based on the combination of a row number and a column number. Thus, for example, use of a single chip computer provided with eight 8-bit input/output ports enables monitoring of the rupture state of 1024 detection lines 3 in 32 bits×32 bits.

In FIG. 2, for the sake of convenience, a circuit structure is shown in which 16 detection lines are connected to respectively a 4-bit column output port 5 and a row input port 6. Furthermore reference numeral 8 in FIG. 2 shows a load resistance provided on each row block of the detection lines 3.

When using a detection apparatus for an object flying in space configured in the above manner, the detection apparatus for an object flying in space is adapted to expand the detection sheet element 1 in a desired space environment for the measurement of a distribution of objects flying in space, for example, in a state of being mounted on a space vessel revolving in an orbit about the earth. In this state, when an object flying in space collides with the detection sheet element 1, the detection line 3 present at the position of collision is ruptured when the object flying in space passes through the thin film 2. In this manner, when a detection line 3 becomes ruptured, since the number and position of the ruptured detection line 3 can be detected by the detection circuit 4, it is possible to determine the size of the object flying in space that has collided with the detection sheet element 1 from the number of simultaneously ruptured detection lines 3 at a time.

In this manner, since a detection apparatus for an object flying in space according to the present invention enables detection of collision with an object flying in space and enables detection of the size of the colliding object flying in space, measurement of the number and size of the objects flying in space that have collided per unit area is enabled with reference to the surface area of the detection sheet element 1.

Since the detection sheet element 1 may be provided with detection lines 3 by etching on the thin film 2, it can be adapted to be extremely lightweight and facilitates expansion of the area. Therefore the measurement region for objects flying in space can be simply expanded according to this type of detection sheet element 1.

Moreover, since the principle of detection of objects flying in space is based on a simple phenomenon of rupturing of detection lines 3 by collision with an object flying in space, the detection circuit 4 has only to monitor the presence or absence of conduction in each detection line 3, and therefore enables detection of collision with an object flying in space and detection of the size of a colliding object flying in space without the need for calibration.

Furthermore, although the detection circuit 4 must be protected by storage or the like in the space vessel, since the detection sheet body 1 is lightweight and can be deformed freely, flexible disposition is enabled including disposition by attachment to a thermal blanket on an outer surface of a space vessel, expansion by using an antenna mounted on a space vessel, expansion using a predetermined mast, and the like.

When the detection line 3 is ruptured by collision with an object flying in space, although subsequent collision of an object flying in space in regions along the ruptured detection line 3 can no longer be detected, there is no effect on the function itself of detection of an object flying in space other than a only reduction in the effective detection area for an object flying in space by a area corresponding to the region along the ruptured detection line 3, that is to say, the effective detection area which is the denominator is only reduced when calculating on the basis of what size of object flying in space collides how many times per unit area. Thus continuous detection of an object flying in space is enabled over the long term.

Figure 3:
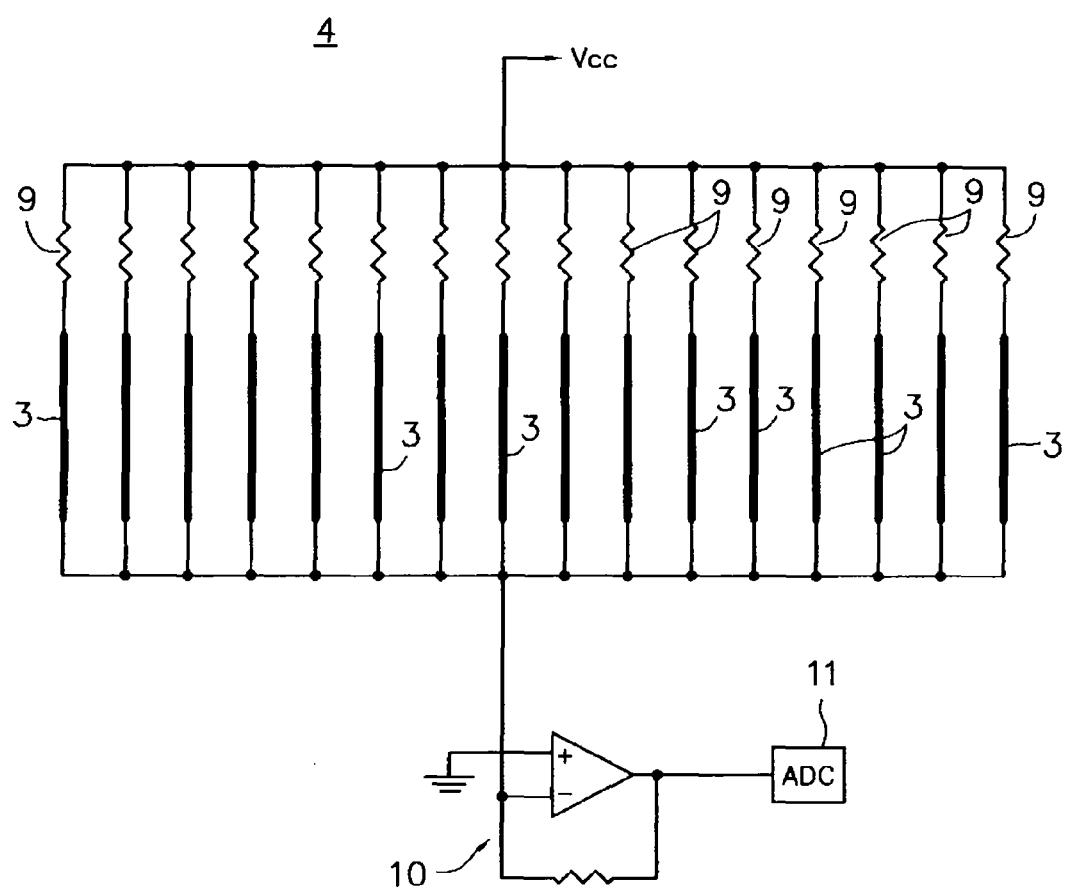
FIG. 3 is a circuit diagram showing another example of a detection circuit in FIG. 1A.

And now, in the above exemplary embodiment, although the detection circuit 4 is a circuit executing digital detection using a diode matrix, as shown in FIG. 3, a detection circuit 4 may be used that has a circuit configuration which executes analog detection of a current flowing in each detection line 3 provided in the detection sheet element 1.

In other words, the detection circuit 4 as shown in FIG. 3 has configuration that each detection line 3 that a current limiting resistor 9 is connected to separately is connected in parallel to a current/voltage conversion circuit 10, and an analog/digital conversion circuit 11 is connected to the current/voltage conversion circuit 10. Thereby a predetermined current flows into each detection line 3 via the current limiting resistor 9, and the total of such currents can be measured by the current/voltage conversion circuit 10 and the analog/digital conversion circuit 11. In the detection circuit 4 above, when a detection line 3 becomes ruptured, the current value flowing in the current/voltage conversion circuit 10 is decreased by the number of ruptured lines and therefore the number of ruptured detection lines 3 can be analyzed using the measurement result of the analog/digital conversion circuit 11.

In a 12-bit analog/digital conversion circuit 11 which generally finds wide application as the analog/digital conversion circuit 11, since a change of $\frac{1}{4096}$ of the full scale can be detected, for example, monitoring of the rupture state of 1024 detection lines 3 which is ¼ of the above total can be facilitated. In FIG. 3, for the purposes of simplifying illustration, the circuit structure is shown as 16 detection lines 3.

A detection circuit 4 having the above configuration does not enable analysis of the position of the ruptured detection line 3. However when a high-speed element is included in the current/voltage conversion circuit 10, higher resolution of the collision time is enabled in comparison with the digital circuit configuration shown in FIG. 2.

Figure 4:
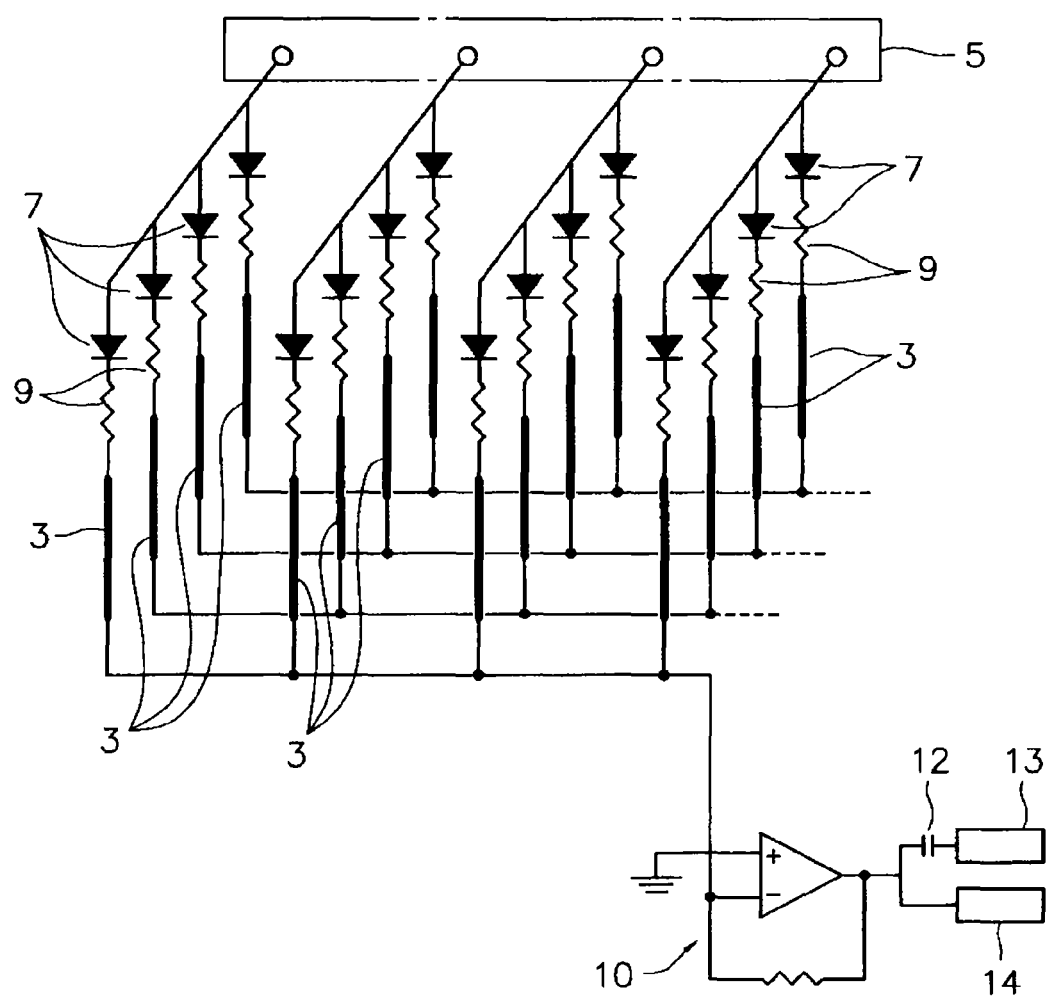
FIG. 4 is a circuit diagram showing yet another example of a detection circuit in FIG. 1A.

Moreover, when it is taken into account that a rupture of a detection line 3 by reason of a collision with an object flying in space occurs only very rarely (at least in an interval of several seconds), the detection circuit 4 in FIG. 1A, FIG. 1B and FIG. 2 may be configured as a hybrid circuit configuration in which digital and analog elements are combined as shown in FIG. 4.

In other words, in the same manner as the digital circuit shown in FIG. 2, the detection circuit 4 shown in FIG. 4 assigns a row number and column number to all detection lines 3 disposed on the detection sheet element 1, and connects each column of detection lines 3 in parallel to each bit of the column output port 5 via the separate current limiting resistors 9 as shown in FIG. 3 and a separate diode 7 which insulates each detection line 3 in the same manner as FIG. 2 from other components. Furthermore, the input row side of each detection line 3 is connected to the current/voltage conversion circuit 10 in the same manner as shown in FIG. 3 corresponding to each row, and the output side of the current/voltage conversion circuit 10 is connected to a current fluctuation detection unit 13 via a highpass filter 12 (shown for convenience in the figure by a capacitor symbol). Moreover, the output side of each current/voltage conversion circuit 10 is also connected in parallel to a current detection unit 14 that detects the presence or absence of a current.

In this manner, under normal conditions, all the column outputs can be placed in the ON position, and the output of the current/voltage conversion circuit 10 provided on each row can be monitored by the current fluctuation detection unit 13 via a highpass filter 12. In this arrangement, when a rupture of the detection line 3 occurs, the detection of the rupture of the detection line 3 and the time of such rupture can be comprehended by observing the current change in the current fluctuation detection unit 13 corresponding to one or more row.

Furthermore when a rupture in a detection line 3 is detected in the above manner, thereafter, the row outputs are sequentially placed in an ON position one row at a time, and the presence or the absence of a current at that time is detected by the current detection unit 14 from the output of the current/voltage conversion circuit 10 to thereby enable analysis of the rupture position of the detection line 3 in the same manner as a digital detection circuit.

Thus the above hybrid detection circuit 4 enables analysis of all features such as the rupture time and the rupture position of a detection line 3, and the number of ruptured detection lines 3. Furthermore although the circuit configuration is somewhat complicated, the required power can be adapted to be substantially the same as the analog detection circuit 4 shown in FIG. 3.

As well, although the hybrid detection circuit 4 has a circuit configuration in which each detection circuit 3 is insulated from other components using the diode 7, the detection lines 3 have an extremely fine structure and are arrayed in parallel having a width of 50 μm at an interval of 50 μm. In contrast, the diode 7 has as size of 1.25×2.5 mm even when a small surface area mounting type is used, and is large when compared to the detection line 3. Consequently, problems associated with mounting the diode 7 on each detection line 3 occur due to the large shape change in the actually mounted portion and the difficulty of mounting.

In consideration of the above problems, it has been proposed to use a low offset operational amplifier (OP amp) that an input offset voltage as the current/voltage conversion circuit 10 is relatively low. By using a low offset operational amplifier in this manner as the current/voltage conversion circuit 10, the effect of sneak current between detection lines 3 can be made extremely small even when a diode 7 is not provided.

In other words, as shown in FIG. 4, one end (output end) of each detection line 3 connected in common is connected to one end of a feedback resistor and to an opposite phase input end of the operational amplifier that configure the current/voltage conversion circuit 10. However since the positive phase input end of the operational amplifier is connected to ground, the opposite phase input end has the same potential as the positive phase input end, that is to say, it has a grounding potential, and thereby prevents a current flowing in a detection line 3 from creating a sneak current in another detection line 3 and thus enables an independent configuration for each detection line 3.

As described above, the merits and demerits of each configuration of the detection circuit 4 in the digital configuration shown in FIG. 2, the analog configuration shown in FIG. 3, or the hybrid configuration shown in FIG. 4 are shown in the table below.

TABLE 1

| Method | Digital | Analog | Hybrid |
|---|---|---|---|
| Number of ruptured detection lines | ◯ | ◯ | ◯ |

TABLE 1-continued

| Method | Digital | Analog | Hybrid |
| --- | --- | --- | --- |
| Rupture position | ○ | X | ○ |
| Measurement of rupture time | X | ○ | ○ |
| Simple circuit | ○ | ○ | Δ |
| Required power | ○ | Δ | Δ |

Thus an optimally adapted type of detection circuit 4 can be suitably selected and used by taking into consideration the items in relation to what is to be detected, the cost and time required for construction of the circuit, and the available power.

Figure 5A:
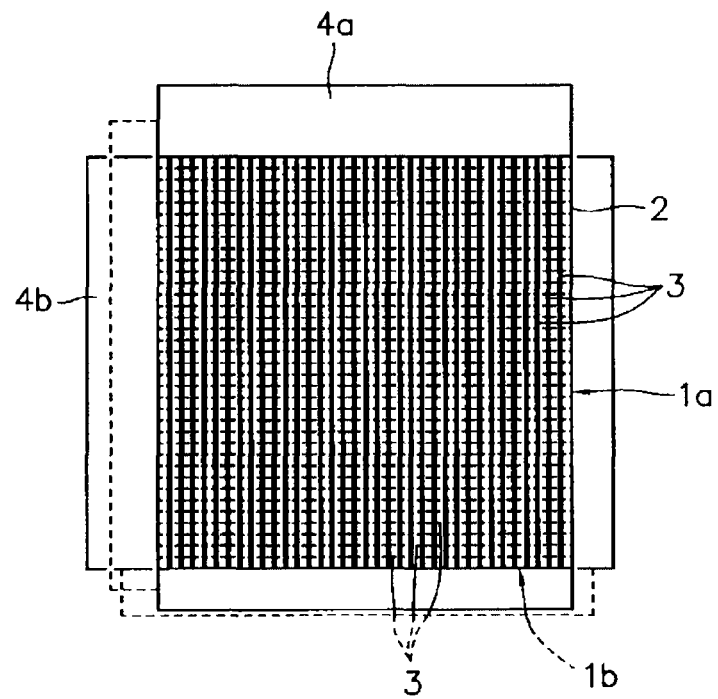
FIG. 5A is a schematic plan view of a detection apparatus for an object flying in space according to another embodiment of the present invention.
Figure 5B:
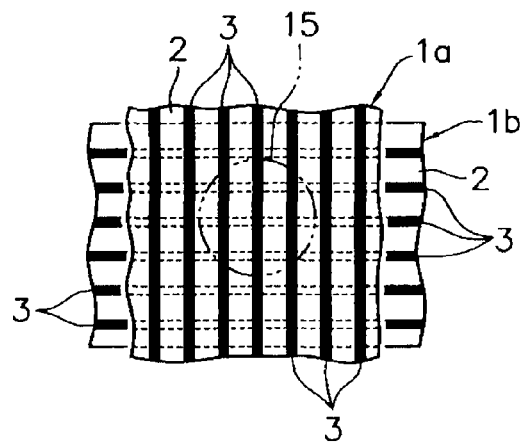
FIG. 5B is a partial enlargement view of a detection sheet element in a detection apparatus for an object flying in space according to the another embodiment of the present invention.
Figure 5C:
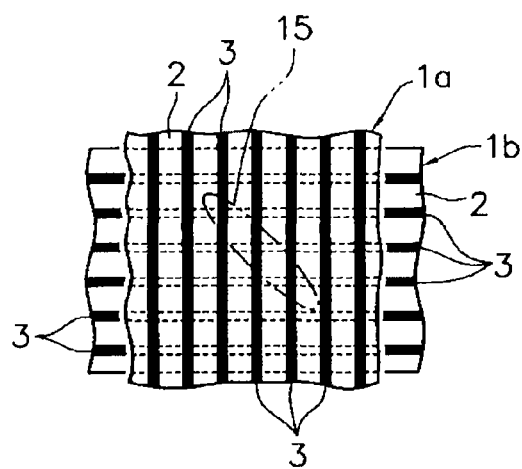
FIG. 5C is a partial enlargement view of a detection sheet element in a detection apparatus for an object flying in space according to the another embodiment of the present invention.

Next, FIG. 5A, FIG. 5B and FIG. 5C shows a detection apparatus for an object flying in space according to another embodiment in which two detection sheet elements 1a, 1b respectively having the same configuration of a detection sheet element 1 in the embodiment shown in FIG. 1A, FIG. 1B and FIG. 2 are superimposed so that the direction in which the detection lines 3 extend is mutually orthogonal.

As well, reference numerals 4a and 4b denote detection circuits respectively detecting the rupture state of respective detection lines 3 in the detection sheet elements 1a and 1b. Other aspects of configuration are the same as those illustrated in FIG. 1A, FIG. 1B and FIG. 2, and the same reference numerals have been assigned to the same features.

A detection apparatus for an object flying in space according to the present embodiment enables detection of a collision with an object flying in space based on detection of rupture of the detection line 3 by each respective detection circuit 4a and 4b when a rupture of the detection line 3 is respectively produced in each detection sheet element 1a and 1b by a collision with the object flying in space.

Furthermore combining positional information for the ruptured detection line 3 in the detection sheet element 1a in which a rupture is detected by the detection circuit 4a connected to each detection line 3 in one detection sheet element 1a and positional information for a ruptured detection line 3 in the detection sheet element 1b in which a rupture is detected by the detection circuit 4b connected to each detection line 3 in the other detection sheet element 1b enables to specify the rupture position for the detection line 3 that is ruptured by a collision with an object flying in space on the two-dimensional plane on which each detection sheet element 1a, 1b.

In this manner, even when a rupture of three respective detection lines 3 in the respective detection sheet elements 1a and 1b is detected, if the shape of the hole 15 formed in each of the respective detection sheet elements 1a and 1b by the collision with the object flying in space is substantially circular as shown by the dot-and-dash line in FIG. 5B, it is possible to determine that an object flying in space having an effective diameter of 300 μm has collided from a substantially perpendicular direction with the plane on which each of the respective detection sheet elements 1a and 1b is disposed. On the other hand, as shown by the dot-and-dash line in FIG. 5C, if the shape of the hole 15 formed on each of the respective detection sheet elements 1a and 1b by the collision with the object flying in space is substantially an elongated oval, it is possible to determine that an object flying in space having a smaller effective diameter has collided from an inclined direction at a shallow angle with the plane on which each of the respective detection sheet elements 1a and 1b is disposed.

Thus more accurate detection of the size of a colliding object flying in space and acquisition of the direction of flight (incident direction) of the colliding object flying in space are enabled.

Furthermore even in a region along a detection line 3 that has already been ruptured by a collision with an object flying in space in either one of the detection sheet elements 1a and 1b, if the collision position is not the same, a new collision with an object flying in space can be detected by rupture of a detection line 3 in the other of the detection sheet elements 1a and 1b, and therefore it is possible to greatly increase the number of detections in relation to rupture phenomena. Consequently, detection of an object flying in space can be detected over the long term by suppressing a reduction in the effective detection area resulting from collisions with an object flying in space.

Figure 6A:
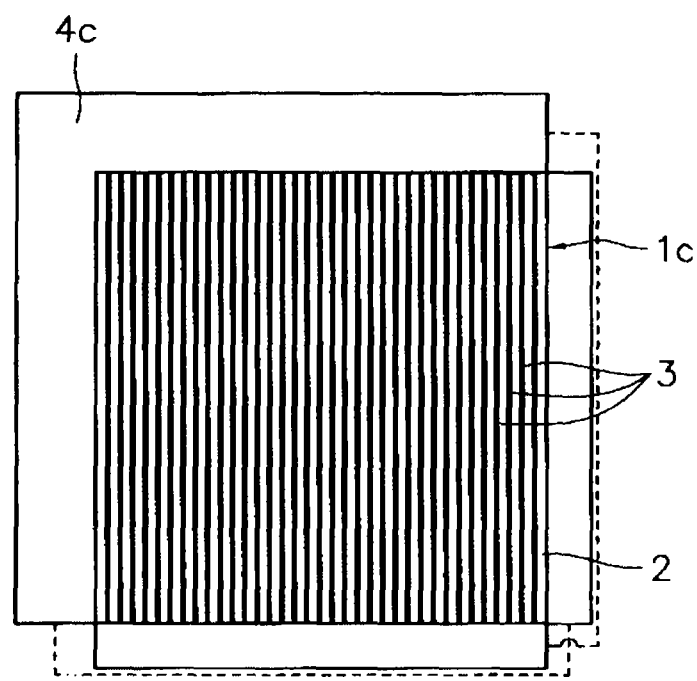
FIG. 6A is a view seen from the surface side of a detection apparatus for an object flying in space according to yet another embodiment of the present invention.
Figure 6B:
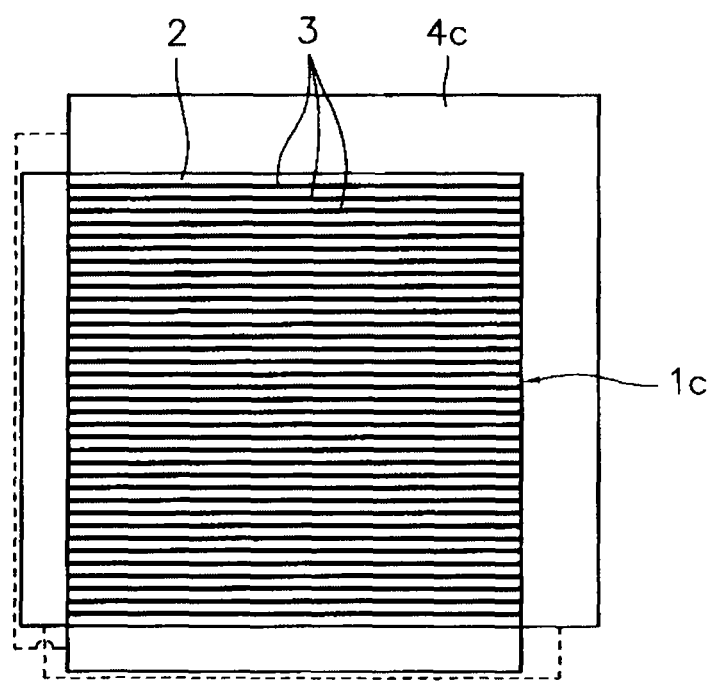
FIG. 6B is a view seen from the rear side of a detection apparatus for an object flying in space according to the yet another embodiment of the present invention.

Next FIGS. 6A and 6B show a detection apparatus for an object flying in space according to yet another embodiment of the present invention in which a detection sheet element 1c is configured by retaining a plurality of detection lines 3 respectively having the same array pitch as shown in FIG. 1A and FIG. 1B as elongated lead lines extending linearly in a mutually orthogonal direction on a front surface and rear surface of the thin film 2 in the same manner as the thin film 2 in the embodiment shown in FIG. 1A, FIG. 1b and FIG. 2. Furthermore a detection circuit 4c connected to all detection lines 3 on the front surface and the rear surface of the detection sheet element 1c is provided.

Other aspects of configuration are the same as those shown in FIG. 1A, FIG. 1B and FIG. 2, and the same components are denoted by the same reference numerals.

The detection apparatus for an object flying in space disposes detection lines 3 extending in a mutually orthogonal direction on the front surface and rear surface of the detection sheet element 1c. Consequently, when respective rupture of the detection line 3 on the front surface and rear surface sides of the detection sheet element 1c occurs as a result of a collision with an object flying in space, the collision with the object flying in space can be detected based on detection of the rupture of the detection line 3 by the detection circuit 4c.

Furthermore by combining positional information for the detection line 3 that has been detected as ruptured on one surface of the front and rear surfaces with positional information for the detection line 3 detected as ruptured on the other surface, it is possible to specify on the two-dimensional plane on which the detection sheet element 1c is disposed the rupture position with reference to the detection line 3 that is ruptured by the collision with the object flying in space.

Thus according to the present embodiment, the same effect is obtained as the embodiment shown in FIG. 5A, FIG. 5B and FIG. 5C.

Figure 7:
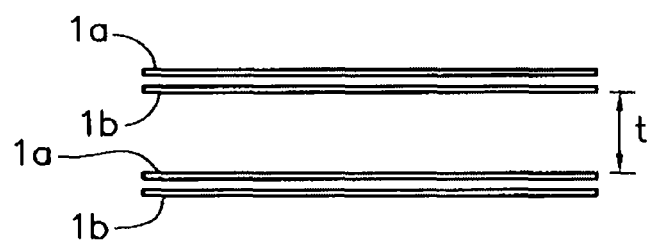
FIG. 7 is a schematic side view showing a configuration of a detection apparatus for an object flying in space according to yet another embodiment of the present invention.

FIG. 7 shows a detection apparatus for an object flying in space according to yet another embodiment of the present invention in which, in the same manner as FIG. 5A, FIG. 5B and FIG. 5C, a pair (laminated body) of two detection sheet elements 1a, 1b which are laminated a detection sheet element 1a and 1b so that the direction of extension of the detection lines 3 is mutually orthogonal, and has configuration that two pairs (two layers) are disposed in parallel and separated by a predetermined interval t, for example, an interval t of substantially 10 cm.

One pair and the other pair formed by pair of the two layers of the detection sheet elements 1a, 1b for example may be adapted to maintain a desired interval t by mounting on both sides of an interval maintaining member of a framing structure (not shown) that has a height dimension that corresponds to the desired interval t.

Other aspects are the same as those shown in FIG. 5A, FIG. 5B and FIG. 5C and the same features are denoted by the same reference numerals.

According to the present embodiment, the same effect is obtained as the detection apparatus for an object flying in space as shown in FIG. 5A, FIG. 5B and FIG. 5C.

Each pair of the pair of detection sheet elements 1a, 1b that is disposed at a predetermined interval t enables to specify the collision position of an object flying in space in the same manner as the apparatus illustrated respectively in FIG. 5A, FIG. 5B and FIG. 5C on a two-dimensional plane on which each detection sheet element 1a and 1b. Consequently, collision positional information of an object flying in space is specified by the detection sheet element 1a, 1b in the upper pair shown in FIG. 7 as one pair of the two pairs of detection sheet elements 1a and 1b disposed and separated by a predetermined interval t, and collision positional information of an object flying in space is specified by the detection sheet element 1a, 1b in the lower pair shown in FIG. 7 as another pair enable more accurate detection of the direction of flight (incident direction) of the colliding object flying in space.

Furthermore it is possible to detect a velocity of an object flying in space from a displacement distance of the object flying in space between each pair calculated from collision positional information for the object flying in space specified by the detection sheet element 1a, 1b in the upper pair in FIG. 7, collision positional information for the object flying in space specified by the detection sheet element 1a, 1b in the lower pair in FIG. 7 as another pair, and the interval t between each pair, and, the time difference between the time point detected by the detection circuit 4a, 4b corresponding respectively to the rupture of the detection line 3 produced by the collision of the object flying in space with the detection sheet element 1a, 1b in the upper pair in shown in FIG. 7 as one pair and the time point detected by the detection circuit 4a, 4b corresponding respectively to the rupture of the detection line 3 produced by the collision of the object flying in space with the detection sheet element 1a, 1b in the lower pair in shown in FIG. 7 as another pair.

The embodiment shown in FIG. 7 illustrates a double-layer pair formed from the detection sheet element 1a and 1b is provided in two parallel pairs separated by a predetermined interval t. However as shown by FIG. 8A and FIG. 8B, either one of the pairs may be substituted by a single layer detection sheet element 1 in the same manner as shown in FIG. 1A and FIG. 1B.

When configured in the above manner, the direction of flight (incident direction) of the object flying in space that has collided with the group formed from each sheet element 1a and 1b can be obtained in the same manner as the configuration shown in FIG. 5A, FIG. 5B and FIG. 5C by the pair of the detection sheet element 1a and 1b that is disposed by superimposing as a double-layered pair. Therefore the displacement distance of the object flying in space between the double-layered pair of detection sheet elements 1a, 1b and the single-layered detection sheet element 1 can be calculated from the incident direction and the interval t between the double-layered pair detection sheet elements 1a, 1b and the single-layered detection sheet element 1. Furthermore it is possible to detect a velocity of an object flying in space from the calculated displacement distance, and the time difference between the time point detected by the detection circuit 4a, 4b (refer to FIG. 5A, FIG. 5B, FIG. 5C) corresponding respectively to the rupture of the detection line 3 (refer to FIG. 5A, FIG. 5B, FIG. 5C) produced by the collision of the object flying in space with the double-layered pair detection sheet element 1a, 1b and the time point detected by the detection circuit 1 (refer to FIG. 1A, FIG. 1B) corresponding to the rupture of the detection line 3 (refer to FIG. 1A, FIG. 1B) produced by the collision of the object flying in space with the single-layer detection sheet element 1. Thus the same effect as the embodiment in FIG. 7 can be obtained.

Figure 8A:
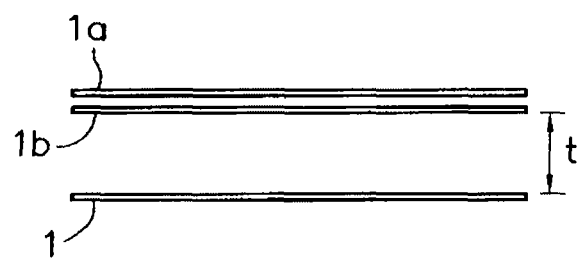
FIG. 8A is a first diagram showing an applied example of the detection apparatus shown in FIG. 7.
Figure 8B:
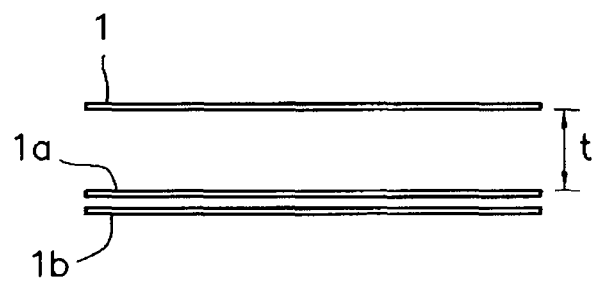
FIG. 8B is a second diagram showing an applied example of the detection apparatus shown in FIG. 7.

The detection apparatus for an object flying in space in FIG. 7 and the detection apparatus for an object flying in space in FIG. 8A and FIG. 8B are both adapted to use a pair (laminated body) of detection sheet elements 1a and 1b formed by disposing and laminating two detection sheet elements 1a, 1b. However the pair of the detection sheet elements 1a and 1b may be substituted by a detection sheet element 1c in which a detection line 3 is provided extending in a mutually orthogonal direction to the front surface and the rear surface as shown in FIG. 6A and FIG. 6B.

Figure 9A:
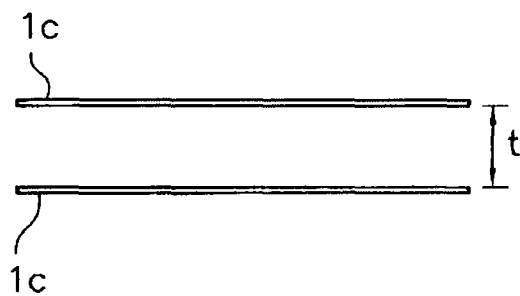
FIG. 9A is a first diagram showing another applied example of the detection apparatus shown in FIG. 7.
Figure 9B:
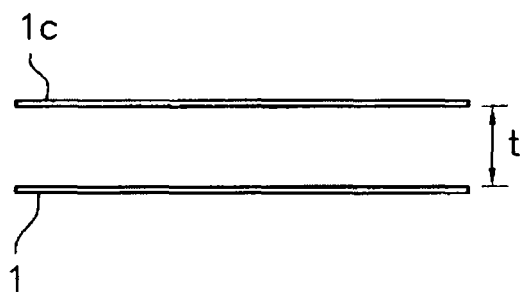
FIG. 9B is a second diagram showing another applied example of the detection apparatus shown in FIG. 7.
Figure 9C:
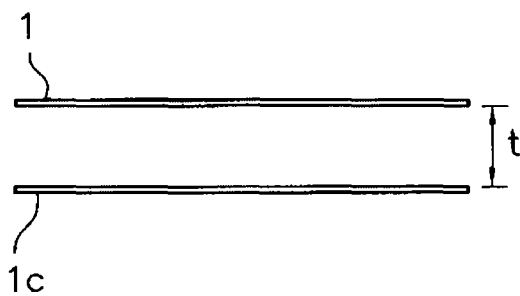
FIG. 9C is a third diagram showing another applied example of the detection apparatus shown in FIG. 7.

In other words, as shown in FIG. 9A, it is possible to obtain the same effect as the embodiment shown in FIG. 7 with a configuration in which the detection sheet element 1c is disposed in parallel in two layers with a predetermined interval t, for example by separation with an interval t of 10 cm. Furthermore, as shown in FIG. 9B and FIG. 9C, if one of the detection sheet elements 1c disposed in two layers in FIG. 9A may be substituted by one detection sheet element 1 in the same manner as shown in FIG. 1A and FIG. 1B, it is possible to obtain the same effect as the embodiment shown in FIG. 8A and FIG. 8B.

Figure 10:
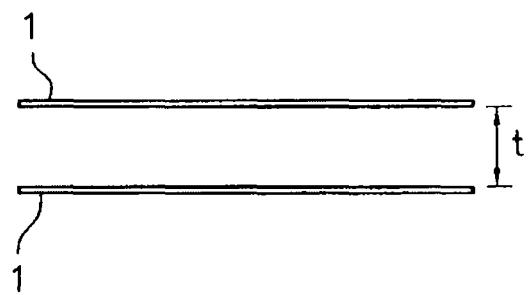
FIG. 10 is a diagram showing yet another applied example of the detection apparatus shown in FIG. 7.

Furthermore as shown in FIG. 10, the detection sheet element 1 as shown in FIG. 1A and FIG. 1B may be disposed as two layers in parallel separated by a predetermined interval t. When configured in this manner, it is possible to obtain the same effect as the embodiment shown in FIG. 1A, FIG. 1B and FIG. 2 and it is possible to estimate the velocity of an object flying in space from the interval t and the time difference when a detection line 3 (refer to FIG. 1A and FIG. 1B) is ruptured by collision with an object flying in space at the two respective layers of the detection sheet element 1 that are separated by a predetermined interval t.

As well, the present invention is not limited to each of the embodiments above, and the array pitch of the detection lines 3 disposed on the detection sheet element 1, 1a, 1b may be suitably modified according to the dimension of the effective diameter which represents the lower measurement limit of the object flying in space to be detected.

Furthermore since rupture of one of the detection lines 3 enables detection of collision of an object flying in space that has an effective diameter at least greater than or equal to the longitudinal dimensions of the detection line 3, the width dimensions of the detection line 3 may be suitably modified according to the lower measurement limit of the effective diameter of the object flying in space to be detected.

The longitudinal dimensions of the detection line 3 may be suitably modified when a configuration is used that enables immediate detection by the detection circuit 4, 4a, 4b when a rupture is produced in respective detection lines 3 provided on the detection sheet element 1, 1a, 1b. Consequently the longitudinal dimension of the thin film 2 configuring the detection sheet element 1, 1a, 1b may be suitably modified according to the longitudinal dimensions set for the detection lines 3. Furthermore the number of detection lines 3 provided on one detection sheet element 1, 1a, 1b may be suitably modified according to the array pitch of the detection lines 3. Furthermore the width dimensions of the thin film 2 may be suitably modified according to the array pitch and the number of detection lines 3 desired to be provided one detection sheet element 1, 1a, 1b.

An arbitrary material may be used as long as the thin film 2 is non-conductive and can be exposed to a space environment.

As long as the detection line 3 is conductive, an arbitrary material other than copper may be used, or the detection line 3 may be provided on the thin film 2 by any method other than etching.

Furthermore according to the processing capacity of the employed detection circuit 4, 4a, 4b, a plurality of detection circuits 4, 4a, 4b, 4c may be used in order to detect a rupture of the detection line 3 provided on a single detection sheet element 1, 1a, 1b, 1c. Furthermore in the embodiment in FIG. 5A, FIG. 5B, FIG. 5C, the embodiment in FIG. 7, the embodiment in FIG. 8A and FIG. 8B, the embodiment in FIG. 9A, FIG. 9B and FIG. 9C, and the embodiment in FIG. 10, rupture of the detection lines 3 of a plurality of the detection sheet element 1, 1a, 1b, 1c may be detected by one detection circuit 4, 4a, 4b, 4c.

As long as the detection circuit 4, 4a, 4b, 4c has a circuit configuration in which the conductivity of the detection line 3 is constantly monitored, and when a rupture is produced in a detection line 3, the number of detection lines 3 that have been ruptured can be detected, any circuit configuration in addition to those configurations shown in FIG. 1, FIG. 3 and FIG. 4 may be adopted.

Of course, various other modifications may be added within a scope that does not depart from the invention.

The invention claimed is:

1. A detection apparatus for an object flying in space comprising:
a detection sheet element that retains in a predetermined array pitch a plurality of spaced conductive detection lines on a non-conductive thin film that can be exposed in a space environment, each conductive detection line being configured to rupture upon impact by an object flying in space, and a detection circuit connected to each detection line and configured to detect the rupture of a detection line by detecting loss of conductance in the detection line; wherein
when a detection line on the detection sheet element is ruptured by a collision with an object flying in space, detection of the object flying in space that has collided with the detection sheet element is enabled by the detection circuit.

2. A detection apparatus for an object flying in space comprising:
two detection sheet elements that retain in a predetermined array pitch a plurality of conductive detection lines on a non-conductive thin film that can be exposed in a space environment, the detection sheet elements laminated so that the direction in which the detection lines extend is mutually orthogonal and each conductive detection line being configured to rupture upon impact by an object flying in space; and
a detection circuit connected to each detection line and configured to detect the rupture of a detection line by detecting loss of conductance in the detection line; wherein:
when a detection line on the detection sheet element is ruptured by a collision with an object flying in space, detection of the object flying in space that has collided with each detection sheet element is enabled by the detection circuit.

3. A detection apparatus for an object flying in space comprising:
a detection sheet element that respectively retains in a predetermined array pitch a plurality of conductive detection lines extending in mutually orthogonal directions on both faces of a non-conductive thin film that can be exposed in a space environment, each detection line being configured to rupture upon impact by an object flying in space; and
a detection circuit connected to each detection line and configured to detect the rupture of a detection line by detecting loss of conductance in the detection line; wherein:
when a detection line on the detection sheet element is ruptured by a collision with an object flying in space, detection of the object flying in space that has collided with each detection sheet element is enabled by the detection circuit.

4. A detection apparatus for an object flying in space comprising:
a detection sheet element that retains in a predetermined array pitch a plurality of conductive detection lines on a non-conductive thin film that can be exposed in a space environment, the detection sheet element disposed in two layers separated by a predetermined interval; and
a detection circuit; wherein:
when a detection line on the detection sheet element is ruptured by a collision with an object flying in space, detection of the object flying in space that has collided with each detection sheet element is enabled by the detection circuit.

5. A detection apparatus for an object flying in space comprising:
a laminated body in which two detection sheet elements that retain in a predetermined array pitch a plurality of conductive detection lines on a non-conductive thin film that can be exposed in a space environment are laminated so that the direction in which the detection lines extend is mutually orthogonal, the laminated body disposed in two layers separated by a predetermined interval; and
a detection circuit; wherein:
when a detection line on the detection sheet element is ruptured by a collision with an object flying in space, detection of the object flying in space that has collided with each detection sheet element is enabled by the detection circuit.

6. A detection apparatus for an object flying in space comprising:
a detection sheet element that respectively retains in a predetermined array pitch a plurality of conductive detection lines extending in mutually orthogonal directions on both faces of a non-conductive thin film that can be exposed in a space environment, the detection sheet element disposed in two layers separated by a predetermined interval; and
a detection circuit; wherein:
when a detection line on the detection sheet element is ruptured by a collision with an object flying in space, detection of the object flying in space that has collided with each detection sheet element is enabled by the detection circuit.

7. A detection apparatus for an object flying in space comprising:
a laminated body in which two detection sheet elements that retain in a predetermined array pitch a plurality of conductive detection lines on a non-conductive thin film that can be exposed in a space environment are laminated so that the direction in which the detection lines extend is mutually orthogonal, and a detection sheet element that retains in a predetermined array pitch a plurality of conductive detection lines on a non-conductive thin film that can be exposed in a space environment, the laminated body and the detection sheet element disposed in two layers separated by a predetermined interval; and a detection circuit; wherein:

when a detection line on the detection sheet element is ruptured by a collision with an object flying in space, detection of the object flying in space that has collided with each detection sheet element is enabled by the detection circuit.

8. A detection apparatus for an object flying in space comprising:

a detection sheet element that respectively retains in a predetermined array pitch a plurality of conductive detection lines extending mutually orthogonal directions on both faces of a non-conductive thin film that can be exposed in a space environment, and a detection sheet element that retains in a predetermined array pitch a plurality of conductive detection lines on a non-conductive thin film that can be exposed in a space environment, the detection sheet elements disposed in two layers separated by a predetermined interval; and a detection circuit; wherein:

when a detection line on the detection sheet element is ruptured by a collision with an object flying in space, detection of the object flying in space that has collided with each detection sheet element is enabled by the detection circuit.

9. The detection apparatus for an object flying in space according to claim 1 wherein the array pitch of the detection lines is set to a dimension corresponding to an effective diameter being a lower measurement limit of an object flying in space to be detected.

10. The detection apparatus for an object flying in space according to claim 2 wherein the array pitch of the detection lines is set to a dimension corresponding to an effective diameter being a lower measurement limit of an object flying in space to be detected.

11. The detection apparatus for an object flying in space according to claim 3 wherein the array pitch of the detection lines is set to a dimension corresponding to an effective diameter being a lower measurement limit of an object flying in space to be detected.

12. The detection apparatus for an object flying in space according to claim 4 wherein the array pitch of the detection lines is set to a dimension corresponding to an effective diameter being a lower measurement limit of an object flying in space to be detected.

13. The detection apparatus for an object flying in space according to claim 5 wherein the array pitch of the detection lines is set to a dimension corresponding to an effective diameter being a lower measurement limit of an object flying in space to be detected.

14. The detection apparatus for an object flying in space according to claim 6 wherein the array pitch of the detection lines is set to a dimension corresponding to an effective diameter being a lower measurement limit of an object flying in space to be detected.

15. The detection apparatus for an object flying in space according to claim 7 wherein the array pitch of the detection lines is set to a dimension corresponding to an effective diameter being a lower measurement limit of an object flying in space to be detected.

16. The detection apparatus for an object flying in space according to claim 8 wherein the array pitch of the detection lines is set to a dimension corresponding to an effective diameter being a lower measurement limit of an object flying in space to be detected.

17. The detection apparatus for an object flying in space according to claim 1 wherein the width of the detection lines is set to a dimension corresponding to an effective diameter being a lower measurement limit of an object flying in space to be detected.

18. The detection apparatus for an object flying in space according to claim 2 wherein the width of the detection lines is set to a dimension corresponding to an effective diameter being a lower measurement limit of an object flying in space to be detected.

19. The detection apparatus for an object flying in space according to claim 3 wherein the width of the detection lines is set to a dimension corresponding to an effective diameter being a lower measurement limit of an object flying in space to be detected.

20. The detection apparatus for an object flying in space according to claim 4 wherein the width of the detection lines is set to a dimension corresponding to an effective diameter being a lower measurement limit of an object flying in space to be detected.

21. The detection apparatus for an object flying in space according to claim 5 wherein the width of the detection lines is set to a dimension corresponding to an effective diameter being a lower measurement limit of an object flying in space to be detected.

22. The detection apparatus for an object flying in space according to claim 6 wherein the width of the detection lines is set to a dimension corresponding to an effective diameter being a lower measurement limit of an object flying in space to be detected.

23. The detection apparatus for an object flying in space according to claim 7 wherein the width of the detection lines is set to a dimension corresponding to an effective diameter being a lower measurement limit of an object flying in space to be detected.

24. The detection apparatus for an object flying in space according to claim 8 wherein the width of the detection lines is set to a dimension corresponding to an effective diameter being a lower measurement limit of an object flying in space to be detected.

* * * * *

UNITED STATES PATENT AND TRADEMARK OFFICE
CERTIFICATE OF CORRECTION

| | | |
|---|---|---|
| PATENT NO. | : 8,564,430 B2 | Page 1 of 1 |
| APPLICATION NO. | : 12/863035 | |
| DATED | : October 22, 2013 | |
| INVENTOR(S) | : Yukihito Kitazawa and Akira Sakurai | |

It is certified that error appears in the above-identified patent and that said Letters Patent is hereby corrected as shown below:

Title Page:

Item 75 should read

Inventors: Yukihito KITAZAWA, Ichikawa (JP);
Akira SAKURAI, Fukuoka-ken (JP)

Signed and Sealed this
Eleventh Day of February, 2014

Michelle K. Lee
*Deputy Director of the United States Patent and Trademark Office*